United States Patent Office 3,234,184
Patented Feb. 8, 1966

3,234,184
POLYURETHANES FROM RING-POLY-
HALOGENATED DIISOCYANATE
Herbert F. McShane, Jr., Forest Hills Park, Wilmington,
John J. Verbanc, Carrcroft, Wilmington, and William
K. Witsiepe, Penndrew Manor, Wilmington, Del., assignors to E. I. du Pont de Nemours and Company,
Wilmington, Del., a corporation of Delaware
No Drawing. Filed June 29, 1961, Ser. No. 120,510
9 Claims. (Cl. 260—75)

This invention relates to a novel polyurethane composition and more particularly to a polyurethane composition prepared from a polyether or polyester glycol, selected aliphatic polyols and selected ring-halogenated toluene diisocyanates.

It is an object of the present invention to provide a novel polyurethane composition. A further object is to provide a soft, tough, polyurethane composition which displays good physical properties such as tear resistance and tensile strength. A still further object is to provide a process for the preparation of these novel polyurethane compositions.

These and other objects of this invention are accomplished by a polyurethane composition which is prepared by reacting (a) from about 2 to 3 moles of a ring-polyhalogenated toluene-2,4- or 2,6-diisocyanate or mixtures thereof wherein the halogen is either chlorine, bromine or mixtures thereof, (b) about one mole of a polymeric glycol having a number-average molecular weight of from about 750 to 3500 and being selected from the group consisting of polyether, polyester glycols and mixtures thereof, and (c) an aliphatic polyhydroxy compound selected from the group consisting of (1) a low molecular weight aliphatic diol which is either cis-1,4-dihydroxy cyclohexane or 2,2-disubstituted-1,3-propane diol wherein the substituents are inert toward isocyanate groups and (2) mixtures of at least one of said low molecular weight aliphatic diols with at least one organic compound having a number-average molecular weight of from about 92 to 4000 and having at least 3 hydroxyl groups per molecule as the sole isocyanate reactable functionality; the total moles of hydroxyl groups in (c) being from about 75 to 100 percent of the difference between the total moles of isocyanate groups in (a) and the total moles of hydroxy groups in (b); with the proviso that no more than about 20 percent of the total moles of hydroxyl groups in (c) be supplied by said organic compound having at least 3 hydroxyl groups per molecule. The novel polyurethane compositions of the present invention may be characterized as being "soft" polyurethane elastomers in that they exhibit a Shore A hardness ranging between about 35 and 70. The vulcanizates obtained from these soft polyurethane elastomers exhibit outstanding physical properties and more particularly, good tear resistance and tensile strength.

The polyurethanes of the present invention can be made by sequential or simultaneous mixing of the above-described reactants in accordance with the above-described over-all proportions. Thus, the polyurethane can be made by mixing together at one time a polyether glycol, 3,5-dichloro-2,4-toluene diisocyanate, and neopentyl glycol, and reacting the mixture thereby obtained to give a tack-free vulcanizate. In a typical representative alternative procedure, a polyether glycol and a ring-polyhalogenated toluene diisocyanate are reacted to form an isocyanate-terminated polyurethane which is finely cured with heat after addition of a selected polyhydric compound such as cis-1,4-cyclohexanediol. Since the reactants can be added in any order, further alternatives will be readily evident to those skilled in the art.

The proportions of reactants should be selected so that from about 2.0 to 3.0 moles of the ring-polyhalogenated toluene diisocyanate [reactant (a)] is used for every mole of polyether or polyester glycol [reactant (b)]. When less than about 2.0 moles are employed, the general properties of the vulcanizates obtained are inferior. Thus, there is a considerable decrease in the modulus at 300% extension, in the tensile strength at break, and in the tear resistance. On the other hand, when more than about 3 moles are used, the vulcanizate obtained is much harder. The proportion of the aliphatic polyhydroxy compound [reactant (c)] is critical; the moles of hydroxyl groups the aliphatic polyhydroxy compound supplies should be from about 75 to 100 percent of the difference between the moles of isocyanate groups provided by reactant (a) and the moles of hydroxyl groups provided by reactant (b). When a smaller proportion of reactant (c) is provided, the polyurethanes which result exhibit low tensile strengths and low tear strength. When greater amounts of reactant (c) are provided, the polyurethanes which result exhibit undesirably high compression sets. No more than about 20 percent of the total moles of hydroxyl groups in (c) should be supplied by the organic compound having at least 3 hydroxyl groups per molecule. Too much triol, or higher functional polyol, introduces an undesirably high cross-link density which leads to a brittle polyurethane composition displaying decreased tear strength, tensile strength and ultimate elongation.

The toluene 2,4- or 2,6-diisocyanates used for making the polyurethanes of the present invention are ring-substituted by 2 or 3 halogen atoms. All the halogen atoms may be chlorine atoms or bromine atoms, or they may include both chlorine atoms and bromine atoms. Representative toluene diisocyanates include: 3,5-dihalo-toluene-2,4- and 2,6-diisocyanates; 3,5,6-trihalo-toluene-2,4-diisocyanates; 3,4,5-trihalo-toluene-2,6-diisocyanates; and mixtures thereof in any portion. Representative examples of these diisocyanates include: 3,5-dichloro-toluene - 2,4-diisocyanate; 3,5 - dichloro-toluene -2,6-diisocyanate; 3,5,6 - trichloro - toluene - 2,4 - diisocyanate; 3,5-dibromo-toluene-2,4-diisocyanate; 3,5,6 - tribromo - toluene-2,4 - diisocyanate; 3-bromo-5-chloro-toluene-2,4-diisocyanate; 5 - bromo - 3 - chloro - toluene - 2,6 - diisocyanate; 6-bromo-3,5-dichloro-toluene-2,4-diisocyanate; a mixture containing (a) 0–35% of 3,5-dichloro-toluene-2,6-diisocyanate and (b) 100–65% of a mixture containing a predominant amount of 3,5-dichloro-toluene-2,4-diisocyanate and small amounts of 3,6-dichloro-toluene-2,4-diisocyanate and 5,6-dichloro-toluene-2,4-diisocyanate.

The polychlorinated diisocyanates can be made by chlorinating the corresponding toluene diisocyanate according to the general directions described in U.S. Patent 2,915,-545. In general, the chlorination is carried out by introducing chlorine gas into strongly agitated toluene diisocyanate, containing about 1 to 3 percent $FeCl_3$ (or $I_2$), about as fast as it is consumed; a small refluixng of chlorine occurs in the Dry-Ice packed reflux condenser attached to the reactor. Approximately 1.2 moles of $Cl_2$ are supplied for every chlorine atom to be ring-substituted. In a similar fashion, bromine atoms can be introduced using BrCl or $Br_2$. About 1.2 moles of BrCl or $Br_2$ are supplied for every bromine atom to be ring-substituted. Sequential introduction of bromine and chlorine atoms is used to make the toluene diisocyanates bearing both chlorine and bromine atoms. The polyhalogenated diisocyanates obtained are freed from side chain halogenated isomers by conventional recrystallization techniques.

The polymeric glycols [reactant (b)] which are used in making the novel polyurethanes of the present invention have a number-average molecular weight ranging between about 750 and 3500. The polymeric glycols are selected from the group consisting of polyether glycols, polyester glycols and mixtures thereof in any proportion.

Representative polyether glycols include, broadly polyalkyleneether glycols, polyalkyleneether-thioether glycols, polyalkylene-aryleneether glycols, and polyalkylene-aryleneether-thioether glycols.

The polyalkyleneether glycols may be represented by the formula HO(RO)$_n$H where R is an alkylene radical containing up to 10 carbon atoms and $n$ is an integer sufficiently large that the number-average molecular weight of the polymer is about 750 to 3500. Not all the alkylene radicals need be the same. Representative examples of these glycols are: poly-1,2-propyleneether glycol; 1,2-polydimethylethyleneether glycol; polyethyleneether glycol; ethylene oxide modified polypropyleneether glycol; polytetramethyleneether glycol; polypentamethyleneether glycol; polydecamethyleneether glycol, and polytetramethyleneformal glycol. Polytetramethyleneether glycol (molecular weight about 1000–3000) is preferred. Polypropyleneether glycol (molecular weight about 1000) is also particularly useful. U.S. Patents 2,870,097 and 2,808,391 and British Patent 733,624 describe further examples of these glycols.

The polyalkyleneether-thioether glycols may be represented by the formula HO(GY)$_n$H, wherein G represents hydrocarbon radicals at least some of which are alkylene, Y represents chalcogen atoms some of which are sulfur and the rest oxygen, and $n$ is an integer sufficiently large so that the polymer has a number-average molecular weight of about 750 to 3500. These glycols are further described in French Patent 1,128,561.

The polyalkylene-aryleneether glycols are similar to the polyalkyleneether glycols except that some arylene radicals are present. The phenylene, naphthalene, and anthracene radicals, which are representative arylene radicals, may be present with or without substituents such as alkyl or alkylene groups. In general, in these glycols there should be at least one alkyleneether having a molecular weight of about 500 for each arylene radical which is present. These glycols are further described in U.S. Patent 2,808,391. When part of the ether oxygens are replaced with sulfur, a polyalkylene-aryleneether-thioether glycol results.

The polyester glycols are made by the polymerization of cyclic lactones (e.g. epsilon caprolactone) or by the usual methods of condensation polymerization from glycols and dicarboxylic acids (e.g. ethylene glycol and propylene glycol reacted with adipic acid to give a linear polyester glycol having a molecular weight of 1000). Hydroxyl-terminated polyesters are described in U.S. patents: 2,698,838; 2,591,884; 2,866,762; 2,850,476; 2,602,783; 2,729,618; 2,779,689; 2,811,493; 2,621,166; and 2,822,349. Other polyesters are described in "Rubber Chemistry and Technology," vol. 23, pp. 812–835; French Patent 1,201,535 and Australian application 20,059/53.

The aliphatic polyhydroxy compounds [reactant (c)] useful in making the novel polyurethanes of the present invention include selected low molecular weight aliphatic diols and mixtures of these diols with selected proportions of organic compounds having at least 3 hydroxyl groups per molecule as their sole isocyanate reactable functionality. Broadly, the low molecular weight diols include cis-1,4-dihydroxycyclohexane and 2,2-disubstituted-1,3-propanediols. The substituents on these propanediols must be unreactive with isocyanates; thus they are free from groups bearing Zerewitinoff active hydrogen atoms (e.g. —SH, —OH, —NH$_2$, —SO$_2$H) and groups which catalyze isocyanate polymerization. Suitable substituents are often alkyl, alkenyl, alkoxy, aryloxy, alkenyloxymethyl. Representative examples of these 2,2-disubstituted-1,3-propanediols includes 2,2-dimethyl-1,3-propanediol (neopentyl glycol) which is preferred; 2-ethyl-2-methyl-1,3-propanediol; 2-methyl-2-n-propyl-1,3-propanediol; 2,2-diisobutyl-1,3-propanediol; 2-allyloxymethyl-2-methyl-1,3-propanediol; 2 - methyl - 2[(4-pentenyloxy) methyl] - 1,3-propanediol; 2-[(allyloxy)ethyl]-2-methyl-1,3-propanediol; 2 - methyl - 2[(10-undecenyloxy)methyl]-1,3 - propanediol; 2 - [(3-methallyloxy)methyl]-2-methyl - 1,3 - propanediol. 2-alkenyloxymethyl-2-alkyl-1,3-propanediols of the general formula

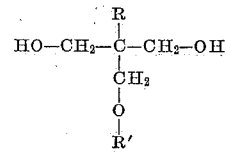

wherein R is a lower alkyl radical having from 1 to 4 carbon atoms and R' is an aliphatic radical of from 3 to 11 carbon atoms which radical has an unsubstituted terminal C=C double bond, are described in U.S. Patent 2,854,486. Mixtures of these low molecular weight aliphatic diols may be used.

Representative examples of the organic compounds having at least 3 hydroxyl groups per molecule and a number-average molecular weight of from about 92 to 4000 which may be used in admixture with the above described low molecular weight aliphatic diols include: glycerol; 1,2,6-hexanetriol; 1,1,1-trimethylolpropane; 1,1,1-trimethylolethane; pentaerythritol; 3-(2-hydroxyethoxy) - 1,2 - propanediol; mannitol; galactitol; talitol; iditol; allitol; altritol; gulitol; arabitol; ribitol; xylitol; lyxitol; erythritol; thriitol; 1,2,5,6-tetrahydroxyhexane; meso-inositol; sucrose, glucose; galactose; mannose; fructose; xylose; arabinose; dihydroxyacetone; glucose-α-methyl-glucoside; 1,1,1-tris[(2-hydroxyethoxy)methyl]ethane; and 1,1,1-tris [(2 - hydroxypropoxy)methyl]propane. Other examples are described in U.S. 2,917,468.

Polyether triols and polyester triols are also useful for admixture with the low molecular weight aliphatic diols. Representative polyalkyleneether triols are made by reacting one or more alkylene oxides with one or more low molecular weight aliphatic triols. The alkylene oxides most commonly used have molecular weights between about 44 and 250. Examples include: ethylene oxide, propylene oxide; 1,2-epoxybutane; 1,2-epoxyhexane; 1,2-epoxyoctane; 1,2-epoxyhexadecane; 2,3-epoxybutane; 3,4-epoxyhexane; 1,2-epoxy-5-hexene; and 1,2-epoxy-3-butene. Ethylene and propylene oxide are preferred. In addition to mixtures of these oxides, minor proportions of alkylene oxides having cyclic substituents may be present such as styrene oxide, cyclohexene oxide, 1,2-epoxy-2-cyclohexylpropane, and α-methyl styrene oxide. The aliphatic triols most commonly used have molecular weight between about 92 and 250. Examples include glycerol; 1,2,6-hexanetriol; 1,1,1-trimethylolpropane; 1,1,1-trimethylolethane; 2,4-dimethyl-2-methylol-pentanediol-1,5 and the trimethylether of sorbitol. Representative examples of the polyalkyleneether triols include: polypropyleneether triol (molecular weight 700) made by reacting 608 parts of 1,2-propyleneoxide with 92 parts of glycerine; polypropyleneether triol (molecular weight 1535) made by reacting 1401 parts of 1,2-propyleneoxide with 134 parts of trimethylolpropane; and polypropyleneether triol (molecular weight 2500) made by reacting 2366 parts of 1,2-propyleneoxide with 134 parts of 1,2,6-hexanetriol.

Further examples of these polyalkyleneether triols are given in U.S. Patent 2,866,774 and Australian application 54,452/59. Polyether compounds having more than 3 hydroxyl groups per molecule are also useful. They are made by reacting the above-described epoxy compounds with aliphatic compounds having 4 or more hydroxyl groups, e.g. sorbitol, pentaerythritol, glucose α-methyl glucoside, sucrose, and erythritol. Representative polyethers are given in Belgian Patent 582,076.

Polyesters having 3 or more hydroxyl groups per molecule are well known to the trade and are made by the usual methods of condensation polymerization from dicarboxylic acids and polyols, some of which have 3 or more hydroxyl groups per molecule.

In order to achieve satisfactory results in preparing the novel polyurethanes of the present invention, homogeneity should be maintained from the time when the reactants are mixed to the time when they have completely reacted to form the final cured polyurethane. Those skilled in the art can select suitable mixing temperatures empirically. Temperatures between 70° and 110° C. are frequently convenient. Agitation is usually employed to achieve thorough mixing and to aid in the temperature control. When everything is homogeneous, the mixture is degassed under vacuum and cured. Temperatures between about 90° and 110° C. are recommended, 100° C. being particularly preferred. In general, the higher the temperature, the shorter the reaction (or cure) time. At 100° C. reaction (cure) times ranging from 10 to 20 hours are generally satisfactory when no catalyst is employed. The incorporation of catalysts for urethane formation (such as triethylenediamine, stannous octoate, dibutyltindilaurate, N-ethyl-morpholine N-oxide, or ferric acetylacetonate) reduces the reaction time needed. For example, polypropyleneether glycol (M.W. 950) and dichlorotoluenediisocyanate were completely reacted in 2 hours at 130° C. when stannous octoate was present (0.02 percent by weight). Those skilled in the art can readily determine the "pot life" and total reaction time for a particular composition by empirical means.

If the process is carried out stepwise, several reaction temperatures may be used. For example, an isocyanate-terminated polyether polyurethane may be prepared at 25 to 110° C. for ½ to several hours (frequently at 80° C. ½ to 2 hours) and thereafter reacted with a low molecular weight polyol (such as neopentyl glycol admixed with trimethylolpropane) at 100° C. for 20 hours. The low molecular weight glycol can be added at room temperature or above—generally it is necessary to heat the mixture to about 90° C. or higher to dissolve the glycol satisfactorily.

Prior to completion of reaction (cure), the polyurethane composition is still plastic, that is it will flow under application of pressure. If desired, conventional molding pressures such as 400 to 600 lbs./sq. in. can be employed to form films and the like.

If desired, part or all of the reaction may be carried out in an inert solvent and the resultant polyurethane isolated by conventional mechanical means such as spray drying, drum drying, or evaporation. The solvent should be free from groups containing Zerewitinoff-active hydrogen atoms, for example OH,

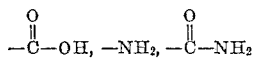

—SH groups.

Representative examples of suitable solvents include lower dialkyl ketones (such as methylisobutyl ketone), ethers, lower alkyl esters (such as ethyl acetate), aromatic hydrocarbons (such as toluene and xylene), aliphatic hydrocarbons (such as hexane), chlorinated aliphatic hydrocarbons (such as trichloro or tetrachloroethylene), and cyclic ethers (such as tetrahydrofuran). Those skilled in the art can readily select a solids content which will permit operating convenience.

As has been mentioned above, the polyurethanes of the present invention have very attractive physical properties, i.e., good tear resistance and good tensile strength, coupled with low hardness. They are particularly suitable for those applications wherein it is desirable and often essential that the elastomer have low hardness and good flexibility. For example, they are useful in certain types of seals and gaskets, hose, shoe soles and heels, solid tires for vehicles where shock absorption is essential to the proper function of the vehicle, flexible sheet material for use as protective covering and for diaphragms and bellows, printing rolls, stoppers, shock absorbers and mountings for delicate instruments and machinery. The good tear and tensile strength of the elastomers of the present invention is a special asset because softness alone is not sufficient. In addition, the elastomer must be tough in order to withstand physical abuse imposed by tensile strains, cutting, and abrasion.

The following examples will better illustrate the nature of the present invention; however, the invention is not intended to be limited to these examples. Parts are by weight unless otherwise indicated.

EXAMPLES

Vulcanizate properties were measured in accordance with the following procedures:

| | A.S.T.M. Method |
|---|---|
| Shore A hardness | D676–58T |
| Compression set (22 hrs., 70° C.) | D395–55 (Method B) |
| Yerzley resilience | D945–55 |
| Tear strength | D624 |
| Permanent set at break | D412–51T |

The modulus at 300% extension ($M_{300}$), tensile strength at the break ($T_B$), the percent extension at the break ($E_B$), and the percent set at break ($S_B$) were measured on Scott dumbbells (ASTM D412–51T) with an Instron testing machine set at a cross-head speed of 20 inches/minute and a load of 200 pounds.

*Example 1*

Eightly grams of polytetramethyleneether glycol (number-average molecular weight about 1,000 and 39 grams of 3,5-dichloro-2,6-toluene diisocyanate were stirred together in a dry reactor protected from atmospheric moisture for 50 minutes at a temperature of 80° C. (ratio NCO:OH=2:1). The isocyanate-terminated polytetramethyleneether polyurethane obtained exhibited a free NCO content of 5.58 percent (by weight). After this polyurethane had been heated to 110° C., 3.45 grams (90 percent of free NCO) of quinitol were added with stirring. The mixture was then poured into an open 3 by 6 inch slab mold and heated therein for 17 hours at 100° C. The vulcanizate obtained exhibited the following properties:

| | | |
|---|---|---|
| $M_{300}$ | lbs./sq. in | 335 |
| $T_B$ | lbs./sq. in | 3750 |
| $E_B$ | percent | 550 |
| $S_B$ | do | 0 |
| Tear strength | lbs./in | 82 |
| Yerzley resilience | percent | 39 |
| Compression set (22 hrs., 70° C.) | do | 21 |
| Shore A hardness | | 60 |

*Example 2*

120 grams of polytetramethyleneether glycol (number-average molecular weight about 1,000) and 58.5 grams of 3,5-dichloro-2,6-toluene diisocyanate (ratio NCO:OH=2:1)

were stirred together under a protective atmosphere in a dry reactor for 25 minutes at 80° C. The polyurethane obtained exhibited a free NCO content of 5.25 percent (by weight). Fifty grams of this polyurethane and 3.10 grams (90 percent of free NCO) of neopentyl glycol were stirred together at room temperature. The mixture was heated to a temperature between 70 and 90° C. while rapid stirring was maintained. At this temperature the glycol dissolved and curing began. The mixture was poured into an open slab mold and heated therein at 100° C. for 24 hours. The vulcanizate obtained exhibited the following properties:

| | | |
|---|---|---|
| $M_{300}$ | lbs./sq. in__ | 450 |
| $T_B$ | lbs./sq. in__ | 3,350 |
| $E_B$ | percent__ | 620 |
| $S_B$ | do____ | 3 |
| Tear strength | lbs./in__ | 91–102 |
| Yerzley resilience | percent__ | 64 |
| Compression set | do____ | 33 |
| Shore A hardness | | 62 |

Example 3

Eightly grams of polytetramethyleneether glycol (number-average molecular weight about 997) and 50 grams of 3,5-dibromo-2,6-toluene diisocyanate (ratio NCO:OH=2:1)

were stirred together under a protective atmosphere in a dry reactor for 45 minutes at 80° C. to give a fluid isocyanate-terminated polyurethane exhibiting a free NCO content of 4.85 percent (by weight). Fifty grams of this polyurethane and 2.71 grams (90 percent of free NCO) of neopentyl glycol were stirred together at 70 to 90° C. under vacuum and the mixture obtained was poured into a 3 by 6 inch open slab mold. The vulcanizate obtained after a cure of 20 hours at 100° C. exhibited the following properties:

| | | |
|---|---|---|
| $M_{300}$ | lbs./sq. in__ | 540 |
| $T_B$ | lbs./sq. in__ | 5,600 |
| $E_B$ | percent__ | 590 |
| $S_B$ | do____ | 2 |
| Tear strength | lbs./in__ | 110 |
| Yerzley resilience | percent__ | 56 |
| Compression set | do____ | 31 |
| Shore A hardness | | 58 |

Example 4

30.6 grams of a ring-dichloro-toluenediisocyanate isomer (80% 2,4-, 20% 2,6-) mixture and 90 grams of polytetramethyleneether glycol (number-average molecular weight about 1,000) (NCO:OH=1.4:1) were stirred together in a dry reactor at 80° C. under an inert atmosphere for 35 minutes. The polyurethane obtained exhibited an NCO content of 2.49 percent (by weight). Fifty grams of this polyurethane and 1.96 grams of neopentyl glycol (90 percent of free NCO) were stirred together at 70 to 90° C. and poured into an open mold. The vulcanizate obtained (20 hours at 100° C.) was too weak to test. This example illustrates that when the molar ratio of ring halogenated-toluene diisocyanate to polytetramethyleneether glycol is less than 2, the ultimate vulcanizate is inferior.

Example 5

Eighty grams of polytetramethyleneether glycol (number-average molecular weight about 988) and 36.9 grams of a ring-dichloro-toluene diisocyanate isomer (80% 2,4- and 20% 2,6-) mixture (ratio of NCO:OH=2.4:1) were stirred together at 80° C. under protective atmosphere in a dry reactor for 35 minutes to give a polyurethane having an NCO content of 7.0 percent (by weight). Fifty grams of the polyurethane and 4.12 grams of neopentyl glycol (90 percent of free NCO) were then agitated under vacuum at 70 to 90° C. The degassed mixture obtained was poured into an open slab mold and heated therein for 20 hours at 100° C. The vulcanizate exhibited the following properties:

| | | |
|---|---|---|
| $M_{300}$ | lbs./sq. in__ | 580 |
| $T_B$ | lbs./sq. in__ | 3,800 |
| $E_B$ | percent__ | 500 |
| $S_B$ | do____ | 0 |
| Tear strength | lbs./in__ | 93 |
| Yerzley resilience | percent__ | 37 |
| Compression set | do____ | 27 |
| Shore A hardness | | 60 |

Example 6

(A) An isocyanate-terminated polyurethane having a free NCO content of 4.60 percent (by weight) was obtained by heating (30 min./80° C.) 85 grams of polytetramethyleneether glycol (number-average molecular weight about 988) and 37.3 grams of ring-dichloro-toluene diisocyanate isomer (80% 2,4-, 20% 2,6-) mixture (0.1535 mole) (NCO:OH=1.8:1). Fifty grams of the polyurethane was mixed at 70 to 90° C. with 2.56 grams (90 percent of free NCO) of neopentyl glycol and the mixture obtained was poured into an open 3 by 6 inch mold and cured at 100° C. for 20 hours. The vulcanizate obtained (compound A) had the following properties:

| | | |
|---|---|---|
| $M_{300}$ | lbs./sq.in__ | 190 |
| $T_B$ | lbs./sq.in__ | 1,050 |
| $E_B$ | percent__ | 730 |
| $S_B$ | do____ | 20 |
| Tear strength | lbs./in__ | 54 |
| Yerzley resilience | percent__ | 68 |
| Compression set | do____ | 44 |
| Shore A hardness | | 50 |

This example illustrates that when the molar ratio of diisocyanate to glycol is less than 2, the ultimate vulcanizate is inferior.

(B) 73.2 grams of polytetramethyleneether glycol (number-average molecular weight about 988) and 50 grams of ring-dichloro-toluene diisocyanate isomer (80% 2,4-, 20% 2,6-) mixture (ratio of NCO:OH=2.8:1) were stirred together in a dry reactor under a protective atmosphere at 80° C. for 35 minutes. Fifty grams of the prepolymer obtained, which had a free NCO content of 8.90 percent (by weight), were stirred with 4.96 grams (90 percent of free NCO) of neopentyl glycol at 70 to 90° C. under vacuum and the degassed mixture obtained was poured into an open 3 by 6 inch mold. After a curing period of 20 hours at 100° C., the vulcanizate obtained, compound B, exhibited the following properties:

| | | |
|---|---|---|
| $M_{300}$ | lbs./sq.in__ | 1,460 |
| $T_B$ | lbs./sq.in__ | 7,000 |
| $E_B$ | percent__ | 490 |
| $S_B$ | do____ | 0 |
| Tear strength | lbs./in__ | 190 |
| Yerzley resilience | percent__ | 17 |
| Compression set | do____ | 36 |
| Shore A hardness | | 68 |

Example 7

One hundred grams fo polytetramethyleneether glycol (number-average molecular weight about 1,940) and 27.57 grams of ring-dichloro-toluene diisocyanate (80% 2,4-, 20% 2,6-) isomer mixture (ratio of NCO:OH=2.2:1) were stirred together in a dry reactor at 80° C. under a protective atmosphere for 1 hour to give a polyurethane having a free NCO content of 4.07 percent (by weight). Fifty grams of the resulting polyurethane and 2.27 grams of neopentyl glycol (90 percent of free NCO) were stirred together under vacuum at 70 to 90° C. and the degassed mixture obtained was poured into an open 3 by 6 inch slab mold. The mold was heated for 20 hours at 100° C. The vulcanizate obtained exhibited the following properties:

| | |
|---|---|
| $M_{300}$ lbs./sq.in. | 265 |
| $T_B$ lbs./sq.in. | 4,200 |
| $E_B$ percent | 760 |
| $S_B$ do | 5 |
| Tear strength lbs./in. | 65–68 |
| Yerzley resilience percent | 72 |
| Compression set do | 53 |
| Shore A hardness | 54 |

*Example 8*

100 grams of an isocyanate-terminated polyurethane having a free NCO content of 6.44 percent by weight, made by reacting 1000 grams of polytetramethyleneether glycol (number-average molecular weight about 1000) and 538 grams of ring-dichloro-toluene diisocyanate isomer (80% 2,4-, 20% 2,6-) mixture (ratio of NCO:OH=2.2:1) was stirred at 70 to 90° C. with 6.82 grams of neopentyl glycol (85.5 percent of free NCO) and 0.306 gram of trimethylol propane) 4.45 percent of free NCO). The mixture obtained was heated at 100° C. at 20 hours to give a vulcanizate exhibiting the following properties:

| | |
|---|---|
| $M_{300}$ lbs./sq.in. | 415 |
| $T_B$ lbs./sq.in. | 6,000 |
| $E_B$ percent | 570 |
| $S_B$ do | 2 |
| Tear strength lbs./in. | 78 |
| Yerzley resilience percent | 46.1 |
| Compression set do | 12 |
| Shore A hardness | 59 |

*Example 9*

110 grams of polyester (a 70/30 ethylene/propylene adipate) having a molecular weight of about 1,350 and 30 grams of ring-dichloro-toluene diisocyanate isomer (80% 2,4-, 20% 2,6-) mixture (ratio of NCO:OH=2:1) were stirred together for 150 minutes at 80° C. in a dry reactor under an inert atmosphere. The isocyanate-terminated polyester obtained exhibited a free NCO content of 4.69 percent (by weight). Fifty grams of this polyurethane and 2.33 grams (80 percent of free NCO) of neopentyl glycol were stirred together at 70 to 90° C. under vacuum. The degassed mixture obtained was poured into an open 3 by 6 inch slab mold and heated therein for 20 hours at 100° C. The resulting vulcanizate exhibited the following properties:

| | |
|---|---|
| $M_{300}$ lbs./sq.in. | 330 |
| $T_B$ lbs./sq.in. | 4.200 |
| $E_B$ percent | 620 |
| $S_B$ do | 0 |
| Tear strength lbs./in. | 57 |
| Yerzley resilience percent | 38 |
| Compression set do | 1 |
| Shore A hardness | 54 |

*Example 10*

146 grams of polypropyleneether glycol (number-average molecular weight about 950) and 90 grams of ring-dichloro-toluene diisocyanate isomer (80% 2,4-, 20% 2,6-) mixture (ratio of NCO:OH=2.4:1) were stirred together under a protective atmosphere in a dry reactor at 80° C. for 2 hours. The fluid polyurethane obtained exhibited a free NCO content of 7.67 percent (by weight). Fifty grams of this polyurethane and 4.33 grams (90 percent of free NCO) of neopentyl glycol were stirred together at 70 to 90° C. under vacuum and the mixture obtained was poured into an open 3 by 6 inch slab mold. After curing for 20 hours at 100° C., the vulcanizate obtained displayed the following properties:

| | |
|---|---|
| $M_{300}$ lbs./sq.in. | 430 |
| $T_B$ lbs./sq.in. | 4,100 |
| $E_B$ percent | 610 |
| $S_B$ do | 0 |
| Tear strength lbs./in. | 100 |
| Yerzley resilience percent | 7.1 |
| Compression set do | 10 |
| Shore A hardness | 70 |

*Example 11*

198.53 grams of polytetramethyleneether glycol (number-average molecular weight about 988) and 106.67 grams of ring-dichloro-toluene diisocyanate isomer (80% 2,4-, 20% 2,6-) mixture (ratio of NCO:OH=2.2:1) were stirred together at 80° C. for 35 minutes in a dry reaction vessel protected from atmospheric moisture. The fluid polyurethane obtained contained a free NCO content of 6.41 percent (by weight). To 50-gram portions of this prepolymer were added the following amounts of neopentyl glycol and mixed under vacuum at 70 to 90° C.:

3.98 grams (100 percent of free NCO) (A)
3.78 grams (95 percent of free NCO) (B)
3.585 grams (90 percent of free NCO) (C)
3.375 grams (85 percent of free NCO) (D)

The degassed mixtures were poured into open 3 by 6 inch molds and cured for 20 hours at 100° C. to give the following vulcanizates:

| | A | B | C | D |
|---|---|---|---|---|
| $M_{300}$ | 435 | 400 | 400 | 380 |
| $T_B$ | 4,500 | 4,600 | 4,800 | 4,700 |
| $E_B$ | 620 | 600 | 580 | 540 |
| $S_B$ | 5 | 0 | 0 | 0 |
| Tear Strength | 86–100 | 75–97 | 85 | 74 |
| Yerzley Resilience | 50 | 52 | 53 | 51 |
| Compression Set | 65 | 38 | 19 | 15 |
| Shore A Hardness | 56 | 57 | 56 | 55 |

*Example 12*

A. One hundred grams of polytetramethyleneether glycol (number-average molecular weight about 970) and 48.8 grams of 3,5-dichloro-2,4-toluene diisocyanate (ratio of NCO:OH=2.0:1) were heated rapidly to 80° C. and thereafter slowly stirred at 80° C. under an inert atmosphere in a dry reactor for 70 minutes. After the polyurethane obtained had been allowed to cool over a period of about 30 minutes to 25° C., it exhibited a free NCO content of 5.45 percent by weight.

Fifty grams of the polyurethane prepared above and 3.38 grams of cis-1,4-cyclohexane diol were mixed together at room temperature and heated over a period of about 5 minutes to 100° C. The cis-1,4-cyclohexane diol dissolved to give a homogeneous solution. While intense agitation was maintained, a vacuum of about 5 mm. of mercury was applied until gas evolution from the mixture had ceased. The degassed mixture was then poured at 100° C. into a 3 by 6 inch mold which had been preheated to 100° C. The polyurethane was cured thereafter at 100° C. for 20 hours. The vulcanizate obtained was allowed to stand at room temperature for two weeks at ambient humidity before being tested. The properties of the cured vulcanizate are given in Table A below.

B. The procedure of Part A above was repeated except that the molar ratio of dichloro-toluene diisocyanate to polytetramethyleneether glycol had a value of 1.6 instead of 2.0. The properties of the vulcanizate obtained are given in Table A below.

TABLE A

|  | Ratio 2.0 | Ratio 1.6 |
| --- | --- | --- |
| $M_{300}$ | 420 | 210 |
| $T_B$ | 3,200 | 1,025 |
| $E_B$ | 500 | 700 |
| $S_B$ | 0 | 15 |
| Tear Strength | 65 | 35 |
| Yerzley Resilience | 42 | 72 |
| Shore A Hardness | 64 | 54 |
| Compression Set | 7 | 29 |

Example 13

A. Twenty-nine grams of 3,5-dichloro-2,6-toluene diisocyanate and 80 grams of polytetramethyleneether glycol (number-average molecular weight about 970) (ratio of NCO:OH=2.0:1) were mixed together at 90° C. under a protective atmosphere in a dry reactor. The mixture obtained was then slowly agitated at 70° C. for a period of 50 minutes to give a fluid polyurethane exhibiting a free NCO content of 5.50 percent by weight.

Fifty grams of the polyurethane made by the above procedure were stirred at room temperature with 3.42 grams of cis-1,4-cyclohexanediol. The mixture obtained was heated over a period of about five minutes to 100° C. Then, while intensely agitated, it was subjected at 100° C. to vacuum (5 millimeters of mercury) until gas evolution ceased. The degassed fluid polyurethane was then poured into a 3 by 6 inch slab mold (preheated to 100° C.) and thereafter heated for 20 hours at 100° C. The slab vulcanizate obtained was allowed to stand for two weeks at room temperature and at ambient humidity before its properties were tested. Table B, which follows, gives the data obtained.

B. One hundred grams of polytetramethyleneether glycol (number-average molecular weight about 970) and 39.0 grams of 3,5-dichloro-2,6-toluene diisocyanate (mole ratio of NCO:OH=1.6:1) were heated to 100° C. over a 10 minute period and thereafter stirred slowly under a protective nitrogen atmosphere for a period of 35 minutes. The fluid polyurethane obtained exhibited a free NCO content of 3.51 percent by weight. Fifty grams of this polymer and 2.28 grams of cis-1,4-cyclohexane diol were stirred together at room temperature and heated over a period of about five minutes at 100° C. After the mixture had been degassed under vacuum (about 5 mm. of mercury), it was poured into a 3 by 6 inch slab mold which had been preheated to 100° C. After a cure of 20 hours at 100° C. the vulcanizate obtained was allowed to stand two weeks at room temperature and at ambient humidity. It displayed the properties listed below in Table B.

TABLE B

|  | Ratio 2.0:1 | Ratio 1.6:1 |
| --- | --- | --- |
| $M_{300}$ | 410 | 235 |
| $T_B$ | 4,130 | 1,800 |
| $E_B$ | 535 | 600 |
| $S_B$ | 0 | 5 |
| Tear Strength | 87 | 49 |
| Yerzley Resilience | 51 | 66 |
| Compression Set | 23 | 20 |
| Shore A Hardness | 62 | 56 |

Example 14

Twenty-five grams of polytetramethyleneether glycol (number-average molecular weight about 970), 12.24 grams of 3,5-dichloro-2,4-toluene diisocyanate (ratio of diisocyanate to polymeric glycol 2.0:1), and 2.78 grams (95 percent of excess NCO) of cis-1,4-cyclohexane diol were stirred together vigorously under a protective atmosphere to a temperature of about 90° C. The homogeneous mixture thereby obtained was subjected to a vacuum of about 5 mm. of mercury until gas evolution ceased. The degassed fluid mixture obtained was then poured into a 3 by 6 inch slab mold (preheated to 100° C.) and cured thereafter at 100° C. for 20 hours. The vulcanizate obtained was removed from the mold and allowed to stand at room temperature for two weeks under ambient humidity conditions. The properties then measured were as follows:

$M_{300}$ ----------lbs./sq. in.-- 360
$T_B$ ----------lbs./sq. in.-- 3,850–4,170
$E_B$ ----------percent-- 580

Example 15

Two hundred grams of polytetramethyleneether glycol (number-average molecular weight about 1,940) and 60.2 grams of ring-dichloro-toluene diisocyanate (80% 2,4-, 20% 2,6-) isomer mixture (ratio of NCO:OH=2.4:1) were stirred together for one hour at 80° C. in a dry reactor under an inert atmosphere. The isocyanate-terminated polyurethane obtained exhibited a free NCO content of 4.58 percent by weight. Fifty grams of this polyurethane were stirred at 70 to 90° C. under vacuum with 1.853 grams (75 percent of free NCO) of neopentyl glycol and 0.268 gram (15 percent of free NCO) of trimethylolpropane. The degassed mixture obtained was poured into an open 3 by 6 inch slab mold and heated therein for 20 hours at 100° C. The resulting vulcanizate exhibited the following properties:

$T_B$ ----------lbs./sq. in.-- 4,600
Tear strength ----------lbs./in.-- 58
Shore A hardness ---------- 54

Example 16

The polyalkyleneether-thioether glycol employed had a number-average molecular weight of about 1500 and was made by condensing 0.496 mole thiodiglycol with 0.449 mole of 1,4-butanediol at 100° C. in the presence of a p-toluenesulfonic acid catalyst.

A fluid isocyanate-terminated polyurethane having an NCO content of 6.74 percent by weight was prepared by agitating 85 grams of the polymeric glycol and 37.1 grams of a ring-dichloro-toluene diisocyanate isomer (80% 2,4-, 20% 2,6-) mixture (ratio NCO:OH=2.7:1) for 35 minutes at 80° C. in a dry reactor under an inert atmosphere. Fifty grams of this polyurethane were stirred at 70 to 90° C. under vacuum with 3.72 grams (90 percent of free NCO) of neopentyl glycol to give compound A. For purposes of comparison, 50 grams of the polyurethane were mixed with 2,3-butanediol (3.25 grams, 90 percent of free NCO) instead of neopentyl glycol to give compound B. After a cure of both of these compounds for 20 hours at 100° C., the rubbery slabs obtained exhibited the following properties:

|  | A | B |
| --- | --- | --- |
| $M_{300}$ | 850 | 1,450 |
| $T_B$ | 1,800 | 2,400 |
| $E_B$ | 360 | 500 |
| $S_B$ | 0 | 9 |
| Tear Strength | 50 | 125 |
| Yerzley Resilience | 43 | (¹) |
| Compression Set | 7 | 44 |
| Shore A Hardness | 58 | 87 |

¹ Too hard to test.

Example 17

A fluid isocyanate-terminated polyurethane having an NCO content of 3.87 percent (by weight) was made by stirring 112 grams of polytetramethyleneether glycol (number-average molecular weight of about 2800) and 25.3 grams of a ring-dichloro-toluene diisocyanate isomer (80% 2,4-, 20% 2,6-) mixture (ratio NCO:OH=2.6:1) for 1.5 hours at 80° C. in a dry reactor under an inert atmosphere. Three mixtures were prepared from this polyurethane at 80 to 100° C. under vacuum.

Mixture A:
  50 grams polyurethane 2.15 grams (90 percent of free NCO) neopentyl glycol Mixture B:
50 grams polyurethane
2.03 grams (85 percent of free NCO) neopentyl glycol
0.103 gram (5 percent of free NCO) 1,1,1-trimethylolpropane Mixture C:
24.11 grams polyurethane
1.18 grams (90 percent of free NCO) of 2-ethyl-2-methyl-1,3-propanediol The vulcanizates obtained by curing these mixtures for 20 hours at 100° C. exhibited the following properties:

| Mixtures | Vulcanizate Data | | |
|---|---|---|---|
| | A | B | C |
| $M_{300}$ | 300 | 320 | 270 |
| $T_B$ | 5,000 | 4,500 | 4,300 |
| $E_B$ | 700 | 660 | 730 |
| $S_B$ | 5-6 | 3-7 | 4 |
| Tear Strength | 75 | 65 | 52 |
| Yerzley Resilience | 74 | 77 | 73 |
| Compression Set | 34 | 26 | 45 |
| Shore A Hardness | 48 | 47 | 47 |

*Example 18*

A fluid isocyanate-terminated polyurethane having a free NCO content of 4.16 percent (by weight) was made by stirring 98.29 grams of an HO-terminated 2-ethyl-2-methyl-1,3-propanediol/adipic acid polyester (number-average molecular weight about 3130) and 22.93 grams of a 3,5-dichloro-toluene diisocyanate isomer (80% 2,4-, 20% 2,6-) mixture (ratio NCO:OH=3.0:1) for 1.5 hours at 80° C. under anhydrous conditions. A vulcanizate obtained by curing 50 grams of this polyurethane with 2.63 grams (90 percent of free NCO) of 2-ethyl-2-methyl-1,3-propanediol for 20 hours at 100° C. exhibited a tear strength of 50 lbs./in. and a Shore A hardness of 45.

*Example 19*

A fluid isocyanate-terminated polyurethane having a free NCO-group content of 7.72 percent (by weight) was made by stirring 83 grams of polypropyleneether glycol (number-average molecular weight of 950) and 51.2 grams of a ring-dichloro-toluene diisocyanate isomer (80% 2,4-, 20% 2,6-) mixture (ratio NCO:OH=2.4:1) for 2 hours at 80° C. under anhydrous conditions. A vulcanizate obtained by mixing 50 grams of this polyurethane with 6.62 grams (90% of free NCO) of 2-allyloxymethyl-2-methyl-1,3-propanediol and 0.084 gram (2% of free NCO) of 1,1,1-trimethylolpropane at 90° C. and curing thereafter at 100° C. for 20 hours, exhibited the following properties:

| | | |
|---|---|---|
| $M_{300}$ | lbs./sq. in. | 350 |
| $T_B$ | lbs./sq. in. | 3,200 |
| $E_B$ | percent | 560 |
| $S_B$ | do | 0 |
| Tear strength | lbs./in. | 75 |
| Yerzley resilience | percent | 8 |
| Compression set | do | 3 |
| Shore A hardness | | 55 |

*Example 20*

A mixture consisting of 25.4 grams of a polypropyleneether triol (number-average molecular weight 2,670; made by reacting 134 parts of trimethylolpropane with 2,536 parts by weight of 1,2-propylene oxide), 97.7 grams of polytetramethyleneether glycol (number-average molecular weight 977) and 61.6 grams of a ring-dichlorotoluene diisocyanate isomer (80% 2,4-, 20% 2,6-) mixture (ratio NCO:OH=2.2:1), was stirred at 80° C. for 2 hours under anhydrous conditions. The liquid NCO-terminated polyurethane obtained had a free NCO-group content of 6.23 percent (by weight).

Fifty parts of this polyurethane were mixed at 90 to 100° C. with 3.47 parts (90% of free NCO) of neopentyl glycol. After deaeration the composition was heated in a mold at 100° C. for 20 hours. The vulcanizate obtained displayed the following properties:

| | | |
|---|---|---|
| $M_{300}$ | lbs./sq. in. | 520 |
| $T_B$ | lbs./sq. in. | 4,700 |
| $E_B$ | percent | 520 |
| $S_B$ | do | 0 |
| Tear strength | lbs./in. | 55 |
| Yerzley resilience | percent | 47 |
| Compression set | do | 10 |
| Shore A hardness | | 54 |

*Example 21*

A mixture of 37.5 grams of polytetramethyleneether glycol (number-average molecular weight 970), 4.26 grams of cis-1,4-cyclohexanediol, and 21.45 grams of 3,5,6-trichlorotoluene - 2,4 - diisocyanate was made at 25° C. under a protective nitrogen atmosphere and thereafter heated rapidly to 100° C. while stirred. It was then degassed by agitation under vacuum at 100° C. for about 5 minutes to give a clear homogeneous solution which was allowed to stand at 100° C. for 5 minutes without agitation. The gummy product was transferred to a mold and cured at 100° C. for 20 hours at 500 lbs./sq. in. pressure. The rubbery vulcanizate obtained exhibited the following properties:

| | | |
|---|---|---|
| $M_{300}$ | lbs./sq. in. | 550 |
| $T_B$ | lbs./sq. in. | 5,100 |
| $E_B$ | percent | 505 |
| $S_B$ | do | 0 |
| Tear strength | lbs./in. | 81 |
| Yerzley resilience | percent | 37 |
| Compression set | do | 28 |
| Shore A hardness | | 66 |

*Example 22*

The ring-dichloro-toluene diisocyanate isomer mixture used in the preceding examples was prepared as follows:

One thousand parts of a well-agitated mixture of toluene diisocyanates (80% 2,4-, 20% 2,6-) was chlorinated neat at 85° C. in the presence of 30 parts of FeCl$_3$. A Dry-Ice condenser was used to reflux excess chlorine while allowing HCl to escape, and chlorine was fed at a rate such that a slow reflux was not exceeded. When approximately 800 parts of Cl$_2$ have been fed, the reaction mass was worked up by sweeping with nitrogen to remove Cl$_2$ and HCl, and heating to 210° C. (and holding there for 1 hour) to finish HCl evolution. The mass was then distilled at 2 mm. and the distillate then fractionated at 10 mm. The cut boiling from 163° C. to 169° C. at 10 mm. was taken as ring-dichloro-toluene diisocyanate.

Analyses indicate it is approximately 25 percent 3,5-dichloro-2,6-toluene diisocyanate, 50 percent 3,5-dichloro-2,4-toluene diisocyanate, 20 percent 5,6-dichloro-2,5-toluene diisocyanate, and 5 percent 3,6-dichloro-2,4-toluene diisocyanate.

The present invention represents a distinct advance in the polyurethane field. Overall properties such as hardness, tensile and tear strength are characteristics of a number of structural features of polyurethane elastomers, one of the most important of which is the structure of the polymeric glycol. Polyether, polythioether, polyester glycols each yield polyurethane elastomers with characteristic combinations of hardness, tensile and tear strengths. Within each of these classes of polyurethanes the use of the halogenated toluene diisocyanates in accordance with this invention will result in obtaining an optimum combination of low hardness and toughness. Comparisons between members of different polyurethane classes are not valid. Thioether based polyurethane polymers tend to exhibit low tensile strength and polyester based polyurethanes exhibit high tensile strength. Thus, where a halogenated toluene diisocyanate based thioether polyurethane may be optimum within its class, it may be inferior in tensile strength to the general class of polyester polyurethanes. With respect to mol ratio limits in accordance with this invention, within each polymeric glycol class the preferred ratio is 2 to 3 moles of diisocyanate per mole of glycol. As stated in the specification, at mole ratios below 2:1 physical toughness is lost (see Examples 4, 6A and B, 12A and B, 13A and B) and at mole ratios higher than 3:1 vulcanizate hardness is too great—that is to say, relatively hard tough vulcanizates are obtained, a result which can be achieved also by the use of diisocyanates other than the halogenated toluene diisocyanates. The present invention provides a combination of relatively low hardness with good tensile and tear strength, a result which cannot be achieved with other diisocyanates.

As many widely different embodiments of this invention may be made without departing from the spirit and scope thereof, it is to be understood that this invention is not limited to the specific embodiments thereof except as defined in the appended claims.

What is claimed is:

1. A tough, soft polyurethane composition prepared by reacting as sole reactants (a) from about 2 to 3 moles of a ring-polyhalogenated diisocyanate selected from the group consisting of ring-polyalogenated toluene-2,4-diisocyanate, ring-polyhalogenated toluene-2,6-diisocyanate, and mixtures thereof, and wherein the halogen is selected from the group consisting of chlorine, bromine and mixtures thereof, (b) about one mole of a polymeric glycol having a number-average molecular weight of from about 750 to 3500 and being selected from the group consisting of polyether glycols, polyester glycols and mixtures thereof, and (c) an aliphatic polyhydroxy compound selected from the group consisting of (1) a lowe molecular weight aliphatic diol selected from the group consisting of cis-1,4-dihydroxy cyclohexane and a 2,2-disubstituted-1,3-propane diol wherein said substituents are each independently selected from the group consisting of alkyl, alkenyl, alkoxy, and alkenyloxymethyl radicals which are inert toward isocyanate groups and (2) mixtures of at least one of said low molecular weight aliphatic diols with at least one organic compound having a number-average molecular weight of from about 92 to 4000 and having at least 3 hydroxyl groups per molecule as the sole isocyanate reactable functionality; the total moles of hydroxyl groups in (c) being from about 75 to 100 percent of the difference between the total moles of isocyanate groups in (a) and the total moles of hydroxyl groups in (b); with the proviso that no more than about 20 percent of the total moles of hydroxyl groups in (c) be supplied by said organic compound having at least 3 hydroxyl groups per molecule.

2. A polyurethane composition according to claim 1 wherein the ring-polyhalogenated diisocyanate is a ring-dichloro-toluene diisocyanate isomer mixture consisting of 80 percent ring-dichloro-toluene-2,4-diisocyanate and 20 percent ring-dichloro-toluene-2,6-diisocyanate.

3. A polyurethane composition according to claim 2 wherein the polymeric glycol is a polypropyleneether glycol.

4. A polyurethane composition according to claim 2 wherein the polymeric glycol is a polytetramethyleneether glycol.

5. A polyurethane composition according to claim 2 wherein the polymeric glycol is a polyalkyleneetherthioether glycol.

6. A polyurethane composition according to claim 2 wherein the polymeric glycol is a polyester glycol.

7. A polyurethane composition according to claim 2 wherein the aliphatic polyhydroxy compound is neopentyl glycol.

8. A polyurethane composition according to claim 2 wherein the aliphatic polyhydroxy compound is 2-ethyl-2-methyl-1,3-propanediol.

9. A cured polyurethane composition obtained by heating the composition of claim 1 at a temperature between about 90 and 110° C.

References Cited by the Examiner
UNITED STATES PATENTS

| | | | |
|---|---|---|---|
| 2,734,045 | 2/1956 | Nelson | 260—77.5 |
| 2,871,218 | 1/1959 | Schollenberger | 260—75 |
| 2,915,545 | 12/1959 | Tazuma. | |
| 2,945,008 | 7/1960 | Caldwell et al. | 260—77.5 |
| 3,036,996 | 5/1962 | Kogon | 260—77.5 |

LEON J. BERCOVITZ, *Primary Examiner.*

HAROLD N. BURSTEIN, *Examiner.*